United States Patent [19]
Homitsu et al.

[11] Patent Number: 5,999,999
[45] Date of Patent: Dec. 7, 1999

[54] COMMUNICATION CONTROL DEVICE AND A COMMUNICATION SYSTEM USING THE SAME

[75] Inventors: Yoshiaki Homitsu; Hiroshi Ichige, both of Hitachi; Shigeo Kuboki, Hitachinaka; Yoshiaki Ajima, Hitachi; Yoshinori Atsuwata, Hitachi; Isao Saitoh, Hitachi; Satoko Iwama, Hitachiota; Takamasa Fujinaga, Hitachi, all of Japan

[73] Assignees: Hitachi, Ltd., Tokyo; Hitachi Engineering Co., Ltd; Hitachi Haramachi Electronics Co., Ltd., both of Ibaraki, all of Japan

[21] Appl. No.: 08/820,309

[22] Filed: Mar. 18, 1997

[30] Foreign Application Priority Data

Mar. 19, 1996 [JP] Japan ...................................... 8-62998

[51] Int. Cl.$^6$ .................................................. G06F 13/00
[52] U.S. Cl. ............................ 710/127; 710/22; 710/52; 710/53; 710/71; 710/128; 710/129
[58] Field of Search ..................................... 395/307, 325, 395/886, 800.14, 200.15; 710/22, 71, 128, 127, 129, 27, 66, 51, 52, 53

[56] References Cited

U.S. PATENT DOCUMENTS

| | | | |
|---|---|---|---|
| 5,151,999 | 9/1992 | Marzucco et al. | 710/22 |
| 5,179,663 | 1/1993 | Himura | 710/35 |
| 5,388,227 | 2/1995 | McFarland | 395/325 |
| 5,394,528 | 2/1995 | Kobayashi et al. | 395/325 |
| 5,426,612 | 6/1995 | Ichique et al. | 365/220 |
| 5,430,844 | 7/1995 | Shitata et al. | 710/26 |
| 5,535,362 | 7/1996 | Ami et al. | 711/147 |
| 5,588,120 | 12/1996 | Shitara et al. | 395/200.15 |
| 5,613,162 | 3/1997 | Kabenijan | 710/22 |
| 5,630,172 | 5/1997 | Ami et al. | 710/25 |
| 5,642,489 | 6/1997 | Bland et al. | 710/128 |
| 5,682,555 | 10/1997 | Yamamoto et al. | 395/886 |
| 5,740,466 | 4/1998 | Geldman et al. | 710/5 |
| 5,742,843 | 4/1998 | Koyanagi et al. | 395/800.14 |

Primary Examiner—Ayaz R. Sheikh
Assistant Examiner—Eric S. Thlang
Attorney, Agent, or Firm—Antonelli, Terry, Stout & Kraus, LLP

[57] ABSTRACT

The communication control device allows a plurality of data items to be transferred to and from external devices, such as a CPU and a memory, via an external bus having a different data bus width in DMA (direct memory access) transfer mode. DMA transfer is controlled by the DMA controller provided in the communication control device. The DMA controller produces a signal indicating that a plurality of data items are continual.

8 Claims, 4 Drawing Sheets

COMMUNICATION CONTROL DEVICE AND A COMMUNICATION SYSTEM USING THE SAME

BACKGROUND OF THE INVENTION

The present invention relates to a communication control device for use in data communication applications, and a communication system using the same.

For a high speed communication control device of a class capable of processing several tens of Mbps to 500 Mbps, it is required to substantially improve the throughput of data transmission and reception, thereby a method of expanding the data bus width for a microprocessor (hereinafter referred to as a CPU) has been used. Conventionally, the bus width for a communication control device has been expanded to accommodate a required large bus width by the following method. Such a conventional method will be described by way of example with respect to a communication control unit which has a data bus width of 16 bits and capable of performing a direct memory access (DMA) data transfer to and which is from a 32 bit CPU, with reference to FIG. 5, which is a schematic diagram of such a conventional communication system.

In FIG. 5, numeral 55 denotes a communication control unit which includes a transmitter, a receiver, a transmission FIFO memory unit, a reception FIFO memory unit and a DMA unit. Normally, the communication control unit is a semiconductor integrated circuit (LSI) device which is provided within a data processing unit for performing data communication between a plurality of data processing units. Numerals 58, 62 denote latch registers which register addresses of data to be transferred. Numeral 60 denotes a comparator which compares addresses registered in the latch registers 58, 62. Further, numeral 63 identifies a buffer memory which temporarily stores transfer data. Numeral 70 denotes a 32 bit CPU, 71 denotes an external memory, and 56 and 57 denote an address bus and a data bus, respectively, of the communication control unit 55. Numerals 65, 66, 67, 68 and 69 denote external buses.

Now, with reference to FIG. 6 the, operation of the above-mentioned communication system will be described. FIG. 6 shows a time chart of an address signal and a data bus signal, wherein, for convenience of explanation, data bus 57 is assumed to have a width of 16 bits and external buses 65–69 are assumed to have a width of 32 bits.

In the case of a DMA transfer of data, having a data bus width of 16 bits, between external memory 71, via external bus 67, having a data bus width of 32 bits, and the communication control unit 55, at one cycle of its DMA transfer, an address ADR1 of data which is an object of a current data transfer is transferred via address bus 56 of the communication control unit 55 so as to be registered in latch register 58. Then, lower data DAT1 is transferred via data bus 57 of the communication control unit 55 so as to be stored in buffer 63.

Then, at a second cycle of its DMA transfer, a next address ADR2 is transferred via address bus 56 so as to be registered in latch register 62, and higher data DAT2 is then transferred via data bus 57 of the communication control unit 55 so as to be stored in buffer 63. After confirmation of the values in the latch registers, it is determined in comparator 60 whether these addresses ADR1 and ADR2 are continual or not. If they are continual addresses, a coincidence signal is output to buffer 63 via a signal line 64. Responsive to this signal, buffer 63 produces to external bus 66 the 32 bit data DAT3 comprising data DAT1 and DAT2, thereby performing data transfer to the external memory 71.

In the conventional communication system as described above, there is a disadvantage in that, since a discrimination circuit to determine whether addresses of data for transfer are continual or not is required, the size of the communication system becomes large.

SUMMARY OF THE INVENTION

An object of the invention is to provide a communication control device and a communication system using the same, which is readily capable of adapting to a larger system bus width larger than its own bus width, with provision of a simple bus width extending circuit of small size.

Another object of the invention is to implement a high speed data transfer using the above-mentioned bus width extending circuit.

The communication control device of the invention allows DMA (Direct Memory Access) transfer of a plurality of data to and from external devices, such as CPUs and memories, via external data buses. The DMA transfer is controlled using a DMA controller provided within the communication control unit, wherein the DMA controller produces a coincidence signal which indicates that a plurality of data are consecutive data.

In the communication system according to the invention, an external apparatus is connected to the communication system via its external data bus, and the above-mentioned communication control unit is connected thereto via a data sequencing circuit which receives a plurality of data from the communication control unit, and, in response to the coincidence signal, produces to the external data bus a single unit data item obtained by sequencing the plurality of data items.

According to the invention, since the DMA controller provided within the communication control unit enables control of data sequencing, a high speed data transfer can be attained. Further, a plurality of data can be sequenced into a single unit of data using a simple sequencing circuit, such as buffer circuits or the like.

DESCRIPTION OF THE PREFERRED EMBODIMENTS

Figure 1:
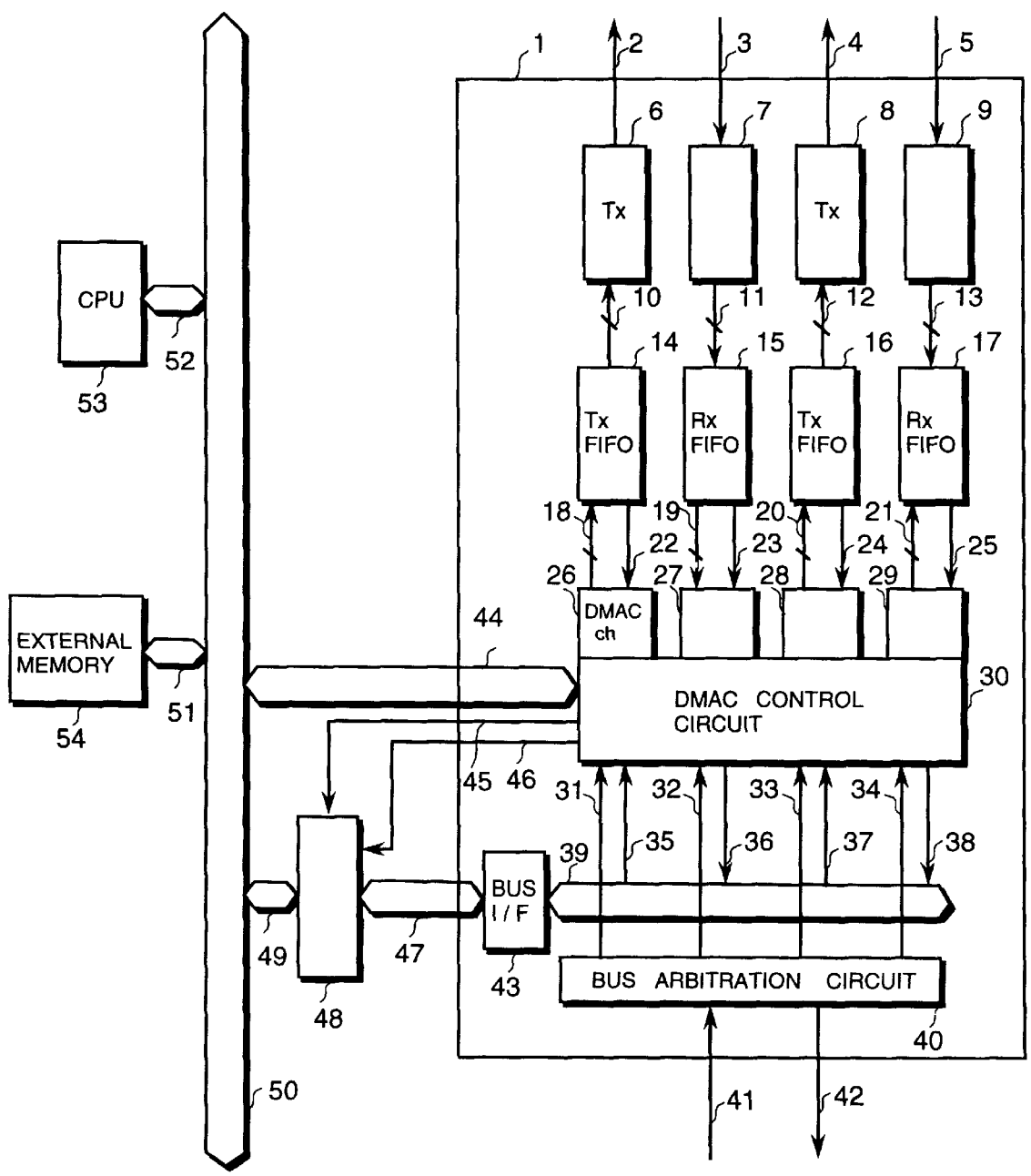
FIG. 1 is a schematic block diagram of a communication control unit according to one embodiment of the invention.

With reference to FIG. 1, the configurations of a communication system and a communication control unit therefor according to one embodiment of the invention will be described in the following.

Numeral 1 in FIG. 1 denotes a communication control unit of the invention, which may be comprised of a plurality of components, and integrated on a single LSI or chip on plural LSI chips. Numerals 6 and 8 denote transmitters, which transmit serial data on lines 2 and 4, which serial data is obtained by converting parallel transmission data, from transmission FIFO 14 and transmission FIFO 16, respectively, into serial transmission data.

Numerals 7 and 9 denote receivers, which receive serial data on lines 3 and 5, and convert the received serial data into parallel data to be stored in reception FIFO 15 and reception FIFO 17, respectively.

Although two transmitters and two receivers are shown in this embodiment of the invention to constitute two serial channels, respectively, the number of serial channels is not limited thereto, nor are the number of channels of transmitters and receivers.

It is possible to process the data of the transmitters and receivers in this embodiment of the invention using any one of a plurality of protocols, such as the bit synchronous protocol, byte synchronous protocol and asynchronous protocol, or a combination thereof. It is also possible to use, for example, Ethernet, frame relays, ATM, ISDN and other protocols singly or in combination.

Numerals 26–29 depict direct memory access controller (DMAC) channels which allow data transfer between either of the transmitter FIFOs 14, 16 or the receiver FIFOs 15, 17 and a DMAC control circuit 30. Each channel is endowed with a bus priority from bus arbitration circuit 40 and is connected to an internal bus 39 via a respective one of the data lines 35–38. The DMAC control circuit 30 also controls bus interface 43 to allow data transfer to and from CPU 53 and external memory 54 via external buses 50, 51, 52 and sequencing circuit 48.

This embodiment of the invention is described by way of example for a DMAC having signal lines for four channels, however, the invention is not limited by the number of channels.

Upon reception of a bus acknowledgment signal 41 from an external bus master in response to a bus request signal 42, the bus arbitration circuit 40 activates a selected one of the channel selection signal lines 31–34, thereby endowing a bus priority to the one of the DMAC channels 26–29 which is connected to the activated one of the channel selection signal lines.

A method of bus arbitration includes a rotational priority method which endows a bus priority to each channel sequentially by rotation, a fixed priority method which endows a bus priority to a specified channel over non-specified channels, and a random bus priority method which endows a bus priority at random, however, the bus arbitration method which may be employed by the invention is not limited thereto. One or more bus masters may be provided externally or included in the communication control unit.

At one end of external bus 44, the external memory 54 and the CPU 53 are connected via bus 50 according to this embodiment of the invention, however, either one of the bus master and peripheral equipment or both of them may be connected thereto as well.

Figure 2:
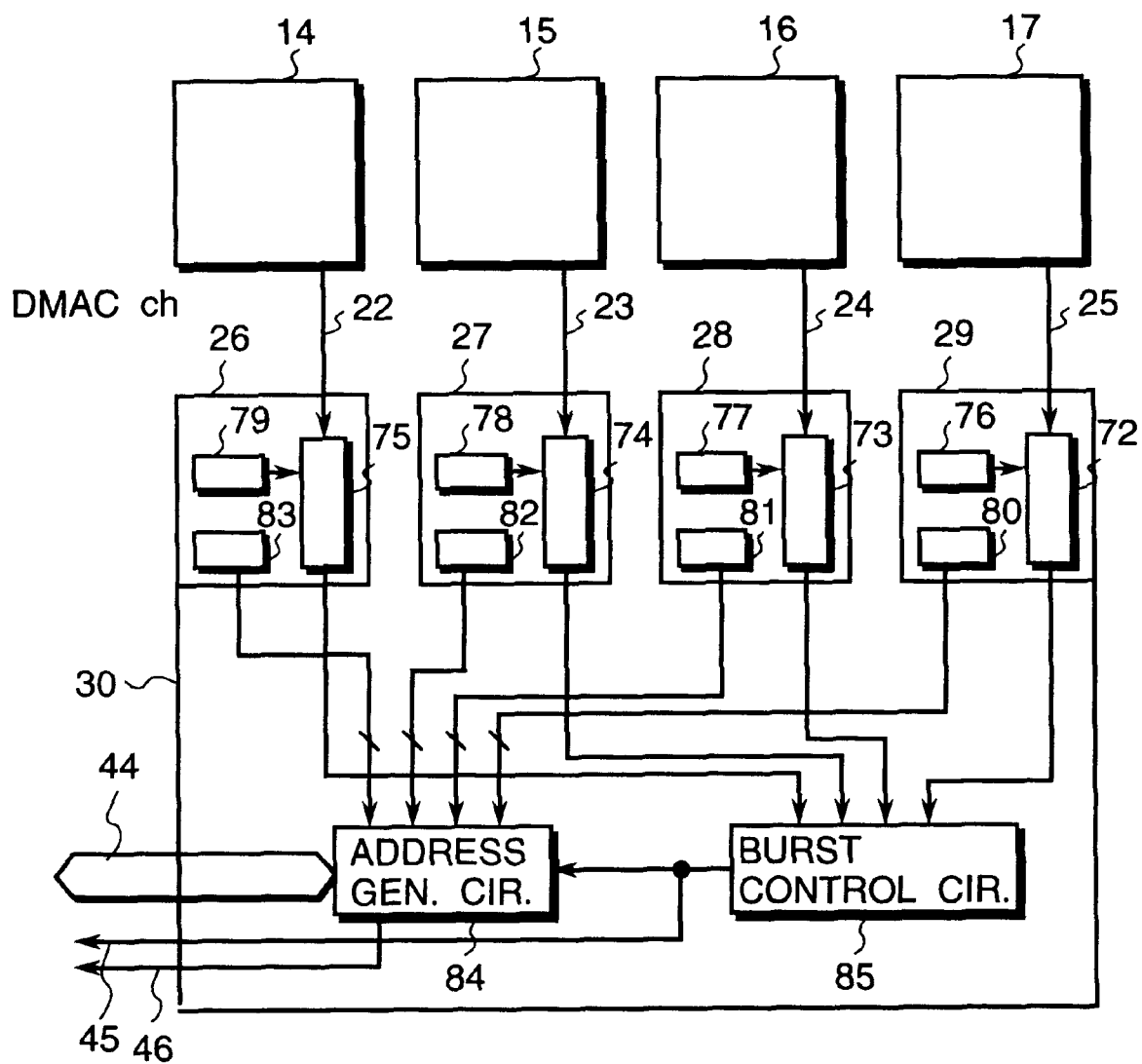
FIG. 2 is a schematic block diagram showing in more detail a part of the communication control unit of FIG. 1.

With reference to FIG. 2, the configurations of the DMAC channels 26–29 and DMAC control circuit 30 of FIG. 1 will be described in more detail.

Numerals 14 and 16 each denote a transmitter FIFO, and numerals 15 and 17 each denote a receiver FIFO.

Numerals 72–75 denote burst generation circuits which output a burst signal.

Numerals 76–79 denote, respectively, one of the registers provided in each of the DMAC channels 26–29 for setting and holding a count equal to the number of words for DMA transfer, wherein the number of words is decremented for each transfer of one word.

Numerals 80–83 denote, respectively, another one of the registers provided in each of the DMAC channels 26–29 for holding a memory address to start a first DMA data transfer for a DMAC channel which is endowed with a bus priority by the bus arbitration circuit 40.

Numeral 84 depicts an address generation circuit which generates successive addresses by fetching start address data from the register in the channel which holds the memory address which is to start the first DMA data transfer by the DMAC channel endowed with the bus priority by the bus arbitration circuit 40. Further, the address generation circuit 84 outputs a control signal via buffer control signal line 46 to sequencing circuit 48 for controlling as to which of a higher data or lower data is to be held.

Numeral 85 denotes a burst control circuit which outputs on a signal line 45 a burst signal received from a DMAC channel which is endowed with the bus priority by the bus arbitration circuit 40.

Figure 3:
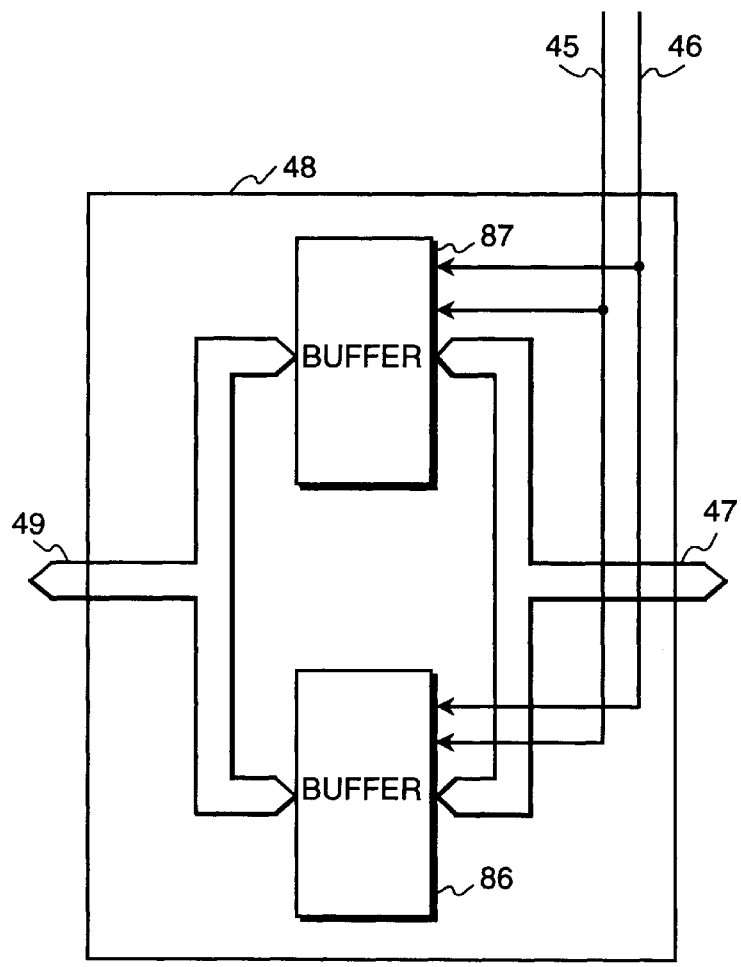
FIG. 3 is a schematic block diagram showing in more detail the sequencing circuit in the communication control unit of FIG. 1.

In reference to FIG. 3, a configuration of the sequencing circuit 48 of FIG. 1 will be described.

This transforming circuit 48 is provided for sequencing two continual data items into one unit data item.

Numeral 45 denotes a burst signal line, 46 denotes a buffer control signal line, 47 denotes a local data bus from the communication control unit, and 49 denotes an external data bus.

Further, numerals 86 and 87 denote respective buffeer memories which store or pass data through on the basis of the status of the burst signal on line 45 and the buffer control signal on line 46.

Figure 4:
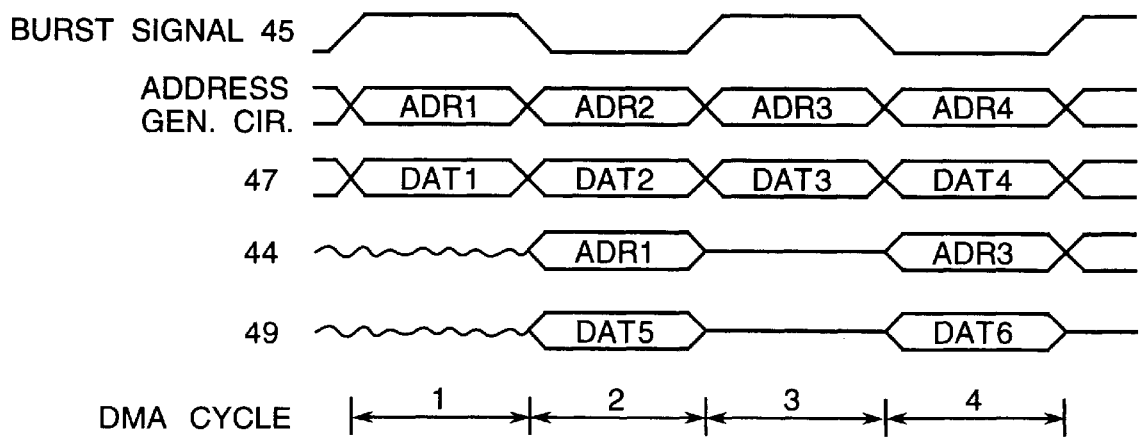
FIG. 4 is a time chart indicative of operation of FIG. 3.
Figure 5:
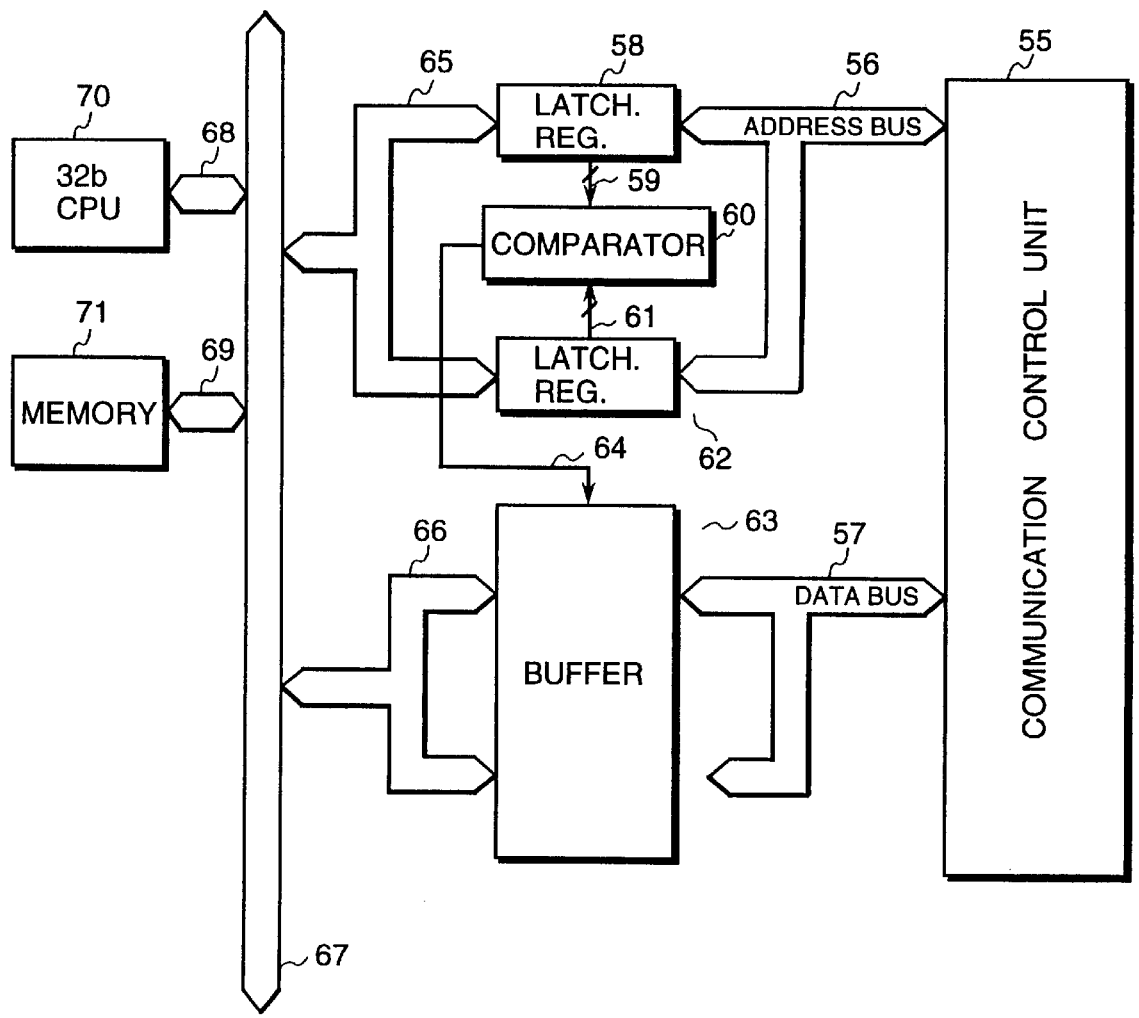
FIG. 5 is a schematic block diagram of a conventional communication control unit.
Figure 6:
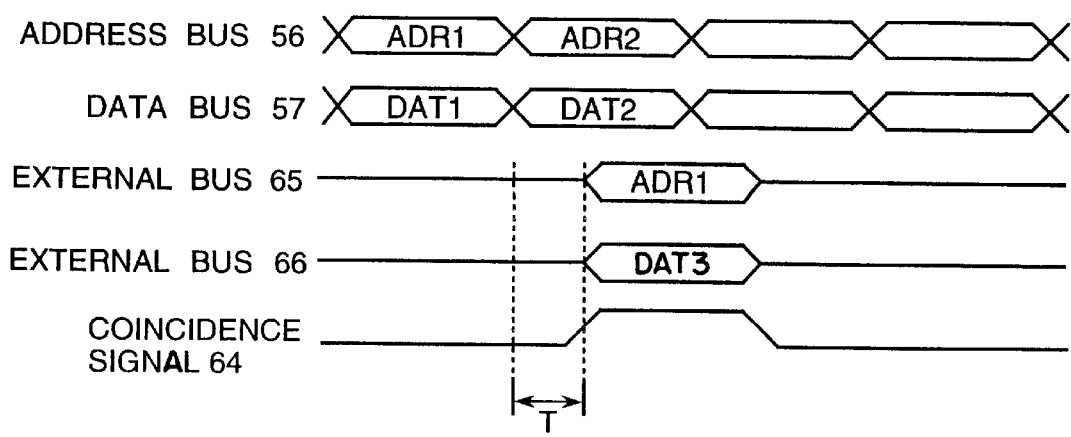
FIG. 6 is a time chart indicative of operation of the communication control unit of FIG. 5.

The operation of this embodiment of the invention will be described with reference to FIG. 4.

A detailed description will be made by way of example wherein the internal bus width is N bits, while the system bus width at destination of DMA transfer of continual data items is 2N bits. FIG. 4 indicates a time chart of the operation. For simplification of description, a bus priority is assumed to have been granted to DMAC channel 27 by bus arbitration circuit 40.

At a first cycle of DMA transfer in this example, burst generation circuit 74 judges that data items subject to DMA data transfer are continual when the number of words of data transfer remaining in the data word count set register 78 is 2N/8 (where the value 8 is a unit transfer bit number of the DMAC), and also the remaining number of reception data in FIFO 15 to be output through signal line 23 is 2N/8. In such case, the burst generation circuit 74 produces an output indicative of this judgment, causing a burst signal 45 to be sent to the external units via burst control circuit 85. Burst signal 45 is input to the sequencing circuit 48, wherein, during a period of time asserted by burst signal 45, a leading data item in a plurality of serial data transmitted on data line 36 through local data bus 47 from communication control unit 1 is received and held in buffer 86 responsive to buffer control signal 46, thereby storing data DAT 1 in buffer 86. Further, the address held in register 82 is input to address generation circuit 84 where an address of the destination in the external memory for DMA data transfer is generated. Then, at a second cycle of DMA transfer, subsequent data DAT2 is transferred to the other buffer 87, which data is transmitted on data line 36 via local data bus 47 from the communication control unit 1 responsive to buffer control signal 46, thereby enabling continual data items to be sequenced in one unit data item. Burst generation circuit 74 produces a burst signal 45 having an inverse polarity from that of the first cycle of DMA transfer during this second cycle. In the second cycle, data DAT5 which is sequenced in sequencing circuit 48 is supplied to the external bus 49. Simultaneously, the address ADR1 of the first DMA data transfer destination is output from address generation circuit 84 via external bus 44, thereby allowing data transfer to and from external memory 54. In the subsequent third and fourth DMA transfer cycles, the same type of DMA transfers as in the first and second cycles are executed.

According to this embodiment of the invention, burst signal 45 is used to assert the first cycle of DMA transfer and negate the second cycle thereof, however, the invention is not limited thereto, and so it is possible for the burst signal 45 to negate the first cycle of DMA transfer and assert the second cycle thereof. Further, the serial speed or system clock frequency may take any value. Still further, a DMA cycle may be two clocks/cycle, one clock/cycle, or any other value thereof. Still more, the DMA speed does not limit the scope of the invention.

The advantages realized by the invention include provision of a communication control apparatus having a high degree of freedom capable of coping with any system bus width at a substantially enhanced transfer efficiency, and is characterized by provision of a compact size control system at a reduced manufacturing cost.

We claim:

1. A communication system comprising:

an external data bus;

an external device connected to said external bus;

a communication control device capable of transferring a plurality of data by DMA transfer mode to and from said external device via said external data bus, said communication control device including:

a DMA controller for controlling said DMA transfer mode and generating a signal indicating that said plurality of data are continuous, and an internal data bus, a bus width of said internal data bus being smaller than a bus width of said external data bus; and a sequencing circuit includes a first buffer for holding first data in one DMA transfer cycle in response to signal; and a second buffer for holding second data in a subsequent DMA transfer cycle, and wherein during said subsequent DMA transfer cycle, said first data and said second data having been held in their buffers are sequenced into said single unit data, which is interconnected between said external data bus and said communication control device and receives said plurality of data and said signal from said communication control device, for sequencing said plurality of data into a single unit data having a bit number which is equal to the bus width of said external data bus responsive to said signal, and for outputting said single unit data to said external data bus.

2. A communication system according to claim 1, wherein a bit number of said external data bus is a sum of each bit number of said plurality of data.

3. A communication system according to claim 1, wherein each bit number of said plurality of data is N bits and a bit number of said external data bus is 2N bits.

4. A communication system according to claim 1, wherein said signal is in synchronism with said plurality of data.

5. A communication system according to claim 1, wherein said plurality of data include at least a first data item and a second data item which is continual to said first data item, and wherein said signal is in synchronism with a signal of said first data item.

6. A communication system according to claim 1, wherein said signal is in synchronism with a DMA cycle.

7. A communications system according to claim 1, wherein said plurality of data include at least a first data and a second data which is continual to the first data, wherein said single unit data has a bit number which is a sum of bit numbers of the first data and the second data.

8. A communication system according to claim 1, wherein each of said first data and second data has a bit number of N while said single unit data item has a bit number of 2N.

* * * * *